Patented Aug. 3, 1954

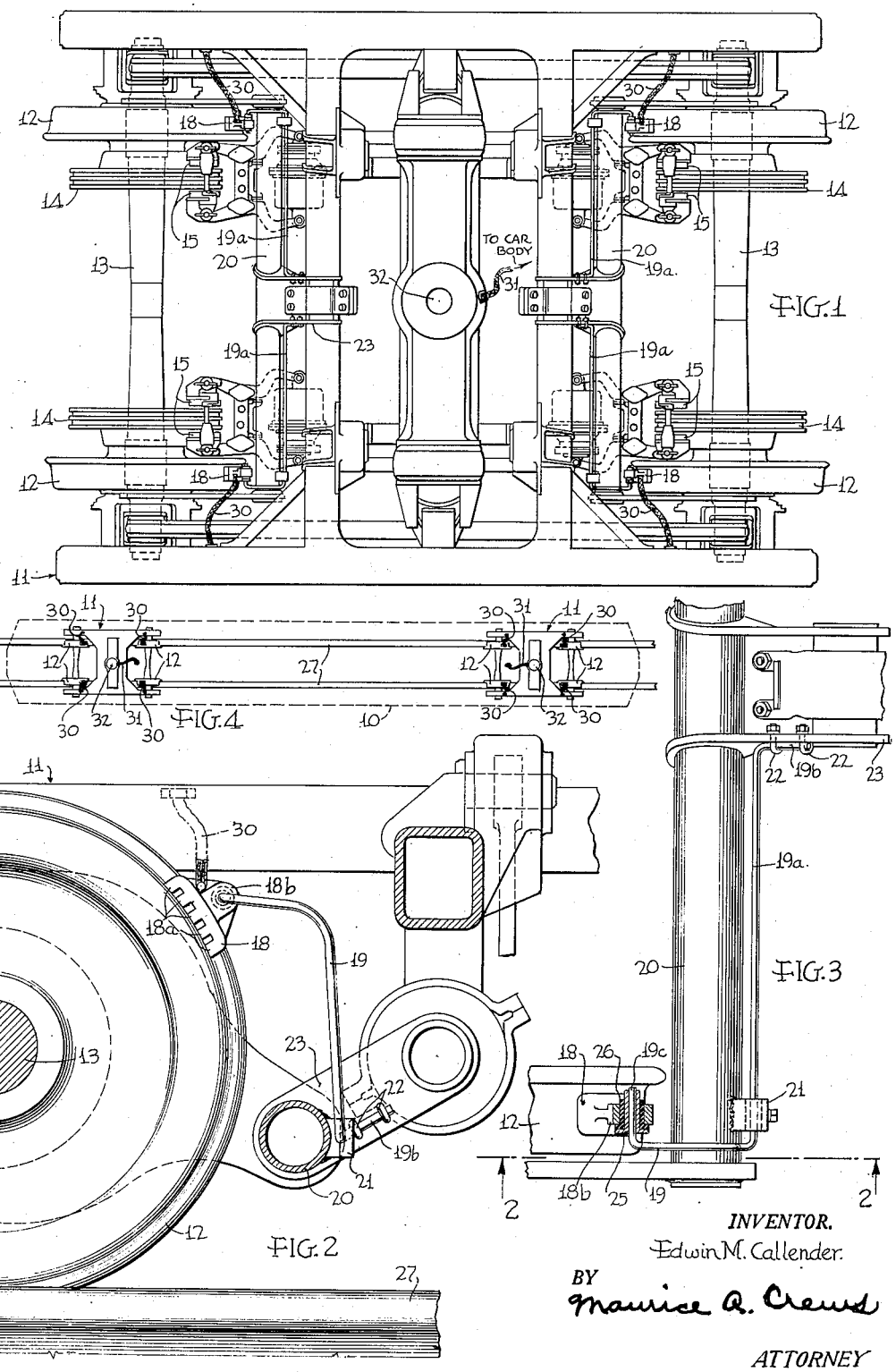

2,685,621

UNITED STATES PATENT OFFICE 2,685,621

RAIL VEHICLE TRACK CURRENT TRANSMISSION MEANS

Edwin M. Callender, Cynwyd, Pa., assignor to The Budd Company, Philadelphia, Pa., a corporation of Pennsylvania Application October 18, 1950, Serial No. 190,785

6 Claims. (Cl. 191—45)

This invention relates to rail vehicle track current transmission means, especially, as concerned with the passage of current between wheels and track, and has for an object the provision of improvements in this art.

In the operation of rail vehicles it is commonly necessary to establish an electrical circuit between the wheels and track, either for propulsion, or for signalling, or both. For propulsion, currents of large amperage are used and such large currents break down wheel-to-track resistance so there is no difficulty in this direction. However, with shunt signalling, with which the present invention is concerned, the current is very small, usually 1 to 3 amperes, and the problem of wheel-to-track resistance becomes very troublesome, especially in single car operation. One common requirement is to establish a shunt connection between track rails to indicate the presence of a vehicle on the track. Both wheels and track are made of very hard material, commonly steel, which will withstand heavy loads and long wear. These materials are not very good conductors of electricity, especially at the contact surface which is very small.

The resistance to the passage of current through the contact area is greatly increased by the accumulation of grease and dirt on those portions of the wheel tread surface which do not normally ride on the crown of the rail to stay bright. If it should happen, due to sand on the track, coated wheel treads, or other causes, that one wheel, rather than a number of wheels together, should be depended upon to pass the desired current, and if at times a dirt-coated portion of the wheel tread should engage the track—as it must at times due to turning curves, side swing, and the like—the passage of current between wheel and track will be reduced to a very great extent. The use of tread engaging brake shoes tends to keep the surface clean but not in a completely reliable manner. In the case of off-tread brakes, such as disk brakes, which are rapidly coming into general use, particularly for resilient wheels such as employ a layer of rubber between the tread and hub portions, there is no cleaning of the wheel tread by brakes at all but only by the rolling contact of the wheel with the rail.

The passage of heavy current through the contact area, such as the current for propelling the vehicle, tends to break down the resistance of the dirt layer or film so as to produce good flow of current; but the pasasge of weak currents, common in signal transmission, is not sufficient to break down the film, and faulty signalling frequently results. It has been proposed to pass a heavy current from the vehicle through the contact area to break down the film (see Ledwinka 2,150,774, for example) and the present invention can be advantageously combined with such a system without requiring special track engaging shoes or brushes.

According to the present invention the wheels of track vehicles are provided with shoes of relatively soft conducting material which will rub off on the wheel tread, filling the surface pores, and form thereon a thin film or coating of highly conductive material which will cause a good flow of current at the contact area, and which, as a side advantage, minimizes rusting of the wheel tread. A material which is relatively soft but hard enough to resist rapid wear and which is a good conductor of electricity is required. One material which has proved to be suitable for the shoes is copper. This, of course, includes copper-containing elements wherein the proportion of copper is sufficient for the purposes disclosed herein. Shoes of this material have run for thousands of miles without appreciable wear, yet have completely satisfied the required functions.

When the shoes are used they bear on the wheels with only a light pressure, as compared to brake shoes, but they remove all dirt and film and so thoroughly coat the tread surface that a single wheel on a rail will always transmit adequate current to provide completely dependable signal operation, even with off-wheel brakes. Single car units using the present system can be operated successfully on shunt signalling, whereas this was not previously sufficiently dependable to be permissible.

In spite of the fact that the shoes cause each wheel tread to carry current efficiently it may happen that one or more wheels at a given time is partly or completely insulated from the track. Such separation between wheel tread and track may be caused by sand, grease, leaves, tar, paper and the like. It rarely happens that every wheel of a single vehicle is thus separated from the track. In case resilient rubber-separated-tread wheels are used there might be good contact at the rail but ineffective transmisison of current from shoes to frame. Again, if the axle supports do not make good contact with the truck frame the transmission of current may be defective when some wheels are separated from the track.

In order to overcome these difficulties and improve the current carrying capacity between rails and the equipment on the vehicle, a flexible conductor may be connected from the soft conductor shoes to the truck frame and thence to the interior equipment or metal car body or directly from the shoes to the car body or interior equipment. This provides a plurality of parallel alternative paths for current and avoids the necessity for dealing with the pasage of current across rubber insulation, axle bearings, and the like. The wheel tread engaging shoes are so arranged and connected that if any wheel of each side of the vehicle establishes good contact with the rail the proper current will be assured.

The above and other objects and advantages of the invention will be apparent from the following description of an exemplary embodiment, reference being made to the accompanying drawings, wherein:

Fig. 1 is a plan view of a truck at one end of a rail car, the truck at the other end being the same;

Fig. 2 is an enlarged end elevation of one wheel and related parts, partly in section on line 2—2 of Fig. 3;

Fig. 3 is a fragmentary top plan view of parts shown in Fig. 2; and

Fig. 4 is a plan view diagram to show the contact arrangement and electrical connection on a car having solid metal wheels force-fitted on metal axles.

As shown in the drawings, a rail vehicle 10 is either of all-metal construction, as is almost exclusively used now, or has a metal frame with a center sill. At each end the car is provided with a metal-framed truck 11 carrying two or more pairs of wheels 12 fast on axles 13. The axles are mounted in bearings on the trucks. The wheels do not carry brakes directly but, instead, off-wheel brakes are used, the brakes shown including disks 14 and clasp brake shoes 15. If resilient wheels with rubber separation are used it is necessary to use off-wheel brakes but, in any event, off-wheel brakes are desirable to save wear on the wheel treads and to give better braking action. In the equipment illustrated it is assumed that all-metal non-resilient wheels are used and that full electrical conductivity from the tread of one wheel to another of a pair is established through the connecting axle on which the wheel hubs are force-fitted.

Each wheel is provided with a shoe 18 of a material which is a good conductor, such as copper, or the like, which will rub off and coat the tread of the wheel but will not wear away quickly. The shoe is preferably slotted across the tread width at a number of places to form a number of separate contact elements 18a to give a better scraping and coating action.

The shoes 18 are carried by supporting means which will keep them resiliently pressed against the wheel treads, the supporting means illustrated comprising resilient arms 19 carried integrally on torsion rods 19a carried by some convenient fixed part of the truck frame. Here the torsion rod is mounted on a lower transverse bar 20 of the truck frame, the outer portion of the torsion rod 19a near the bend to the pressure arm being turnably carried in a bearing 21 and the inner bent end 19b being fixed to the frame, as by U-bolts 22 secured in a plate 23.

A resilient connection is provided between the contact shoe 18 and the torsion rod mounting, the connection here shown comprising a metal sleeve 25 pressed on the bent end 19c and a resilient insulating sleeve 26, as of rubber, pressed on the metal sleeve 25 and pressed into a hole in a projection 18b of the shoe 18. The flange of the wheel prevents the separation of parts, even if they should work endwise, hence no fastening for the sleeves 25 and 26 on the rod end 19c is needed.

The contact shoes, as thus far described, would keep the wheels scraped clean and coated with film of highly conductive metal, preferably copper, to maintain good electrical contact with the rails 27 but, as mentioned above it is preferred to connect the shoes together through the metallic car frame. The connections here shown comprise flexible conductors 30 between the shoes and truck frame and a flexible conductor 31 between the inner part of the truck frame near the king post 32 and the vehicle frame or body. The cables are all preferably welded, brazed or otherwise connected in some known approved manner at their ends.

The cables 30 have to accommodate only for the vertical movements of the wheels relative to the truck frame and the conductor cable 31 has to accommodate only for the turning movement of the truck on its king post, this movement being relatively small because the conductor cable 31 is attached near the axis of turning movement. If desired, the shoes could be connected directly to the car frame by a single longer flexible cable for each shoe, the cables preferably being run in to points of connection near the turning axis of the truck. Because of the number of movable parts on the truck which might foul long cables, the illustrated arrangement is the preferred one.

Besides keeping the wheel tread clear of adherent materials which may be present at any time it has been found that they also cause melting of the film of ice which forms in cold wet weather. The shoes create considerable heat which progressively melts the surface film of ice, temperatures of 175° F. or more being found at the shoes; and this melting effect can be varied by varying the pressure of the shoes on the treads.

It is thus seen that the invention provides simple and practical and inexpensive apparatus for transmitting current between track rails and the vehicle travelling thereon.

The shoes not only scrape ordinary fouling material from the wheel treads but also coat them with a conductive film, and in cold weather melt and rub off the film of ice which tends to accumulate on the tread. The connections provided for the shoes insure that if any one wheel on each side engages a clean part of the rail there will be effective shunting between rails or, in case of vehicle-to-track circuits that adequate current is transmitted between vehicle and track.

The specific shoe mounting means shown herein is the invention of another.

While one embodiment of the invention has been described in detail to illustrate the principles of the invention it is to be understood that there may be various embodiments within the general scope of the invention.

What is claimed is:

1. Rail vehicle track signal current transmission means, comprising in combination, vehicle wheels having treads of a relatively hard material, such as steel, which is not a very good electrical conductor, engaging the track rails, segmental arcuate tread-fitting friction shoe elements arranged on turning pivots on the vehicle adjacent the wheel treads in position to engage the treads to follow their movements, means for holding the shoe elements aagInst the wheel treads with sufficient pressure to remove adherent material and create sufficient friction with the treads to melt ice therefrom, the tread-engaging portion of each shoe element being formed of a soft electrically highly conductive material which under the pressure maintained on the shoe elements will rub off and form a thin coating on the wheel treads to establish a good current conducting connection between rail and wheels and wheels and shoes, and means for establishing an electrical connection from each shoe to parts on the vehicle.

2. Rail vehicle track signal current transmission means, comprising in combination, vehicle wheels having treads of a relatively hard material, such as steel, which is not a very good electrical conductor, engaging the track rails, segmental arcuate tread-fitting friciton shoes of electrically highly conductive material arranged on turning pivots on the vehicle adjacent the wheel treads in position to engage the treads to follow their movements, the material of the shoes which is in engagement with the treads being a good electrical conductor which is considerably softer than the treads, and means for holding the shoes against the treads with sufficient pressure to scrape the treads clean, melt ice off the tread, and to cause material of the shoes to rub off on the treads and form a thin conductive coating thereon to establish a good current conducting connection between the rail and wheels and between the wheels and shoes.

3. Rail vehicle track signal current transmission means, comprising in combination, truck-mounted vehicle wheels having steel treads, relatively soft copper-containing segmental arcuate tread-fitting shoes mounted on the truck, and continuously acting means for resiliently pressing the shoes against the treads of the wheels with sufficient pressure to remove adherent material from them and to keep them coated with the copper-containing metal rubbed off the shoes to thereby maintain good conductive engagement between wheels and track and wheels and shoes, the shoes being of such size and being held under sufficient pressure at all times to generate heat to melt ice from the treads.

4. Rail vehicle track signal current transmission means, comprising in combination, a wheel truck, vehicle wheels mounted on the truck having treads of relatively hard material of low electrical conductivity, such as steel, a segmental arcuate tread-fitting shoe of relatively soft material of high electrical conductivity engaging a wheel tread, continuous acting means resiliently pressing the shoe against the wheel tread with sufficient pressure to keep the tread clean and to keep it coated with material rubbed off the shoe, a conductor connected between the shoe and the truck, and a conductor connected from the truck to the vehicle body, for the purposes set forth.

5. Rail vehicle track signal current transmission means, comprising in combination with a metal rail vehicle having metal trucks each carrying a plurality of metal wheel pairs and connecting metal axles, the wheel treads being formed of a relatively hard metal, segmental arcuate tread-fitting shoes of a relatively soft metal of high electrical conductivity engaging the tread of at least one wheel of each pair of each truck, means for holding the shoes in continuous contact with the treads of the wheels with sufficient pressure to keep the treads clean and to keep them coated with material rubbed off the shoes, at least one of the wheels on each rail for each truck having a metal shoe pressed against its tread, and electrically conductive means connecting the shoes to conductive parts on the vehicle, whereby the track rails may be shunted or current transmitted between the rails and parts on the vehicle.

6. Rail vehicle track signal current transmission means, comprising in combination, with a metal-framed vehicle having a metal-frame center turning truck at each end and two pairs of axle-connected wheels on each truck, the wheel treads being formed of a relatively hard metal, segmental arcuate shoes of relatively soft metal of high electrical conductivity engaging the track-engaging treads of each wheel on both truck frames, continuously acting means pressing the shoes against the wheel treads with sufficient pressure to keep the wheel treads scraped clean and to coat them with soft metal which is rubbed off the shoes, a flexible conductor from each shoe to a truck frame, an a flexible conductor from each truck frame to conductive means on the vehicle, said last mentioned conductive means passing near the center of turning movement of the truck on the vehicle frame.

References Cited in the file of this patent

UNITED STATES PATENTS

| Number | Name | Date |
|---|---|---|
| 257,298 | Dickerson | May 2, 1882 |
| 374,198 | Orcutt | Dec. 6, 1887 |
| 378,259 | Mason | Feb. 21, 1888 |
| 495,940 | Kenevel | Apr. 18, 1893 |
| 579,527 | Westinghouse | Mar. 23, 1897 |
| 747,823 | Wilson | Dec. 22, 1903 |
| 1,428,133 | Bienvenue | Sept. 5, 1922 |
| 2,084,257 | Ledwinka | June 15, 1937 |
| 2,150,774 | Ledwinka | Mar. 14, 1939 |